US012683220B2

(12) United States Patent
Bäder et al.

(10) Patent No.: US 12,683,220 B2
(45) Date of Patent: Jul. 14, 2026

(54) ENERGY STORAGE DEVICE FOR A MOTOR VEHICLE AND METHOD FOR COUNTERACTING A FIRE OF AN ENERGY STORAGE DEVICE

(71) Applicant: AUDI AG, Ingolstadt (DE)

(72) Inventors: Dirk Bäder, Fellbach (DE); Michael Grabowski, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 510 days.

(21) Appl. No.: 18/449,842

(22) Filed: Aug. 15, 2023

(65) Prior Publication Data

US 2024/0106032 A1     Mar. 28, 2024

(30) Foreign Application Priority Data

Sep. 23, 2022    (DE) .......................... 102022124442.3

(51) Int. Cl.
| | |
|---|---|
| *H01M 10/658* | (2014.01) |
| *A62C 3/07* | (2006.01) |
| *A62C 31/00* | (2006.01) |
| *H01M 10/613* | (2014.01) |
| *H01M 10/6567* | (2014.01) |
| *H01M 50/209* | (2021.01) |
| *H01M 50/293* | (2021.01) |

(52) U.S. Cl.
CPC ............. *H01M 10/658* (2015.04); *A62C 3/07* (2013.01); *A62C 31/005* (2013.01); *H01M 10/613* (2015.04); *H01M 10/6567* (2015.04); *H01M 50/209* (2021.01); *H01M 50/293* (2021.01); *H01M 2220/20* (2013.01)

(58) Field of Classification Search
CPC ............. H01M 10/658; H01M 10/613; H01M 10/6567; H01M 50/209; H01M 50/293; H01M 2220/20; A62C 3/07; A62C 31/005
See application file for complete search history.

(56) References Cited

U.S. PATENT DOCUMENTS

| | | | | |
|---|---|---|---|---|
| 2008/0176020 A1* | 7/2008 | Heng | .................... | C04B 35/117 |
| | | | | 165/135 |
| 2012/0312562 A1* | 12/2012 | Woehrle | .............. | H01M 10/425 |
| | | | | 252/2 |
| 2021/0163303 A1* | 6/2021 | Evans | .................... | B32B 5/022 |
| 2021/0332270 A1* | 10/2021 | Chen | .......................... | C09J 1/02 |

(Continued)

FOREIGN PATENT DOCUMENTS

| | | |
|---|---|---|
| DE | 102017008102 A1 | 2/2019 |
| DE | 102021121723 A1 | 3/2022 |

(Continued)

OTHER PUBLICATIONS

Search Report issued on Jun. 29, 2023, in corresponding German Application No. 102022124442.3, 10 pages.

*Primary Examiner* — Matthew J Merkling
(74) *Attorney, Agent, or Firm* — Maier & Maier, PLLC

(57) ABSTRACT

An energy storage device for a motor vehicle includes a battery module and at least one thermally insulating filling element, which is preferably designed as a thermally insulating cell separator element arranged between two battery cells of the battery module. The filling element is designed to be soluble here, so that it dissolves at least in part when it comes into contact with a specific minimum amount of a specific liquid.

12 Claims, 2 Drawing Sheets

(56)     References Cited

U.S. PATENT DOCUMENTS

| | | | | |
|---|---|---|---|---|
| 2022/0181716 | A1* | 6/2022 | Katayama | H01M 10/0525 |
| 2024/0106032 | A1* | 3/2024 | Bäder | H01M 10/6567 |
| 2025/0316791 | A1* | 10/2025 | Imae | D21H 21/34 |

FOREIGN PATENT DOCUMENTS

| | | | |
|---|---|---|---|
| DE | 102020131110 | A1 | 5/2022 |
| WO | 2020190588 | A1 | 9/2020 |
| WO | 2021188421 | A1 | 9/2021 |
| WO | 2022008153 | A1 | 1/2022 |
| WO | 2022024076 | A1 | 2/2022 |

* cited by examiner

ENERGY STORAGE DEVICE FOR A MOTOR VEHICLE AND METHOD FOR COUNTERACTING A FIRE OF AN ENERGY STORAGE DEVICE

FIELD

The invention relates to an energy storage device for a motor vehicle, which includes a battery module and at least one thermally insulating filling element, for example in the form of a cell separator element between two battery cells of the battery module. Furthermore, the invention also relates to a method for counteracting a fire of a battery module.

BACKGROUND

There are various legal requirements that relate to the safety of electric vehicles and their energy storage devices. For example, there are specifications that require that no further cells can be set on fire within five minutes of a thermal runaway of a first cell, i.e., a thermal runaway of such a first cell. In order to ensure this period of time and thus to meet this requirement and also to significantly extend this period of time in the future, one possibility is to introduce fire protection materials in the form of filling elements, in particular cell separator elements, between the high-voltage cells. Such fire protection materials can be designed in such a way that, when they are arranged between the cells and when a first cell is brought to thermal runaway in a laboratory test using a heating pad, the fire is lastingly prevented from spreading to other cells. However, such a laboratory scenario does not always correspond to reality. In reality, for example, it can happen that several cells go into thermal runaway at the same time, as could happen in the event of a crash, for example. In such a case, it accordingly cannot necessarily be guaranteed that the NTP (No Thermal Propagation) measures conceived in laboratory tests, such as the above-mentioned introduction of fire protection materials, can reliably prevent a battery fire or a fire in the entire vehicle. It is therefore still theoretically possible that, despite NTP measures, electric vehicles can still catch fire. These then have to be extinguished by a fire department.

In the event of a battery fire, for example, a fire department can extinguish a high-voltage battery with water. For example, an extinguishing lance can be driven into the high-voltage battery, which can be used to flood the battery with water. However, the NTP measures mentioned above are currently in contrast or goal conflict with such extinguishing measures, since the NTP concepts have the result that there is almost no free volume left in the high-voltage battery to ensure effective flow over all cells. However, providing additional free spaces in a high-voltage battery would require additional installation space, which is not available.

WO 2021/188421 A1 describes a paper suitable for use in a battery or battery pack as a flame barrier or thermal insulation, wherein the paper comprises 60 to 95 percent by weight aerogel powder and 5 to 40 percent by weight polymer fibers, wherein the paper has a thickness between 50 and 4000 μm. Highly porous, hydrophobic, and preferably amorphous silicate particles with a large surface area or granules with a particle size in the range between 10 nanometers and 50 nanometers are used as the aerogel powder.

Furthermore, WO 2022/008153 A1 describes a protective device for battery cells, which are combined in a plurality to form a module for an electric drive of a vehicle, wherein a framework made of plastic is provided between the battery cells, which is coated with a fire-suppressing layer and laterally separates each battery cell from the other battery cell. A fire-suppressing layer can also be applied directly to the housing of the battery cells. An air gap can be provided between each battery cell and each separation chamber of the framework. The thermal insulation layer can consist of a material that converts to ceramic when heated, or forms a thermally insulating foam when heated, or that undergoes an endothermic chemical or physical process at elevated temperatures that absorbs heat.

Although the provision of an air gap also makes it possible in principle to introduce an extinguishing liquid in the event of a fire, the provision of such an air gap in turn requires an enormous amount of additional installation space which is normally unused.

SUMMARY

The object of the present invention is therefore to provide an energy storage device and a method which permit the level of safety to be increased in connection with a possible thermal runaway of a battery cell of a battery module in a manner that saves installation space as much as possible.

This object is achieved by an energy storage device and a method having the features according to the respective independent claims. Advantageous embodiments of the invention are the subject matter of the dependent claims, the description, and the figures.

An energy storage device according to the invention for a motor vehicle includes a battery module and at least one thermally insulating filling element. The filling element is designed to be soluble, so that it dissolves at least in part when it comes into contact with a specific minimum amount of a specific liquid.

If the energy storage device is supplied with an extinguishing liquid as such a specific liquid, for example to counteract a battery fire or to extinguish a battery fire, the filling element, which is located between two battery cells, for example as a cell separator element, can advantageously be flushed out by the supplied extinguishing liquid. Because the filling element is designed to be soluble, it frees up space when it comes into contact with the specific minimum amount of the specific liquid, which can be flushed through accordingly by the extinguishing liquid in order to be able to cool or extinguish the battery cells much more efficiently. However, without the presence of the specific liquid, the filling element has a thermally insulating effect and, in the event of a thermal runaway of a battery cell, can efficiently prevent spreading to adjacent cells or an adjacent battery module, depending on the arrangement of the filling element in the energy storage device. The filling element thus advantageously prevents spreading to the adjacent battery cell in the event of a thermal runaway of a battery cell and, should a fire nevertheless occur and it is accordingly necessary to supply an extinguishing liquid to the energy storage device for extinguishing purposes, the filling element can be dissolved by supplying this liquid, due to which the extinguishing liquid can efficiently flow through the free spaces created by the dissolution, for example between the battery cells. As a result, the battery cells of the energy storage device can be cooled much more efficiently and a fire can be extinguished much more efficiently. In addition, no additional space is required to create the necessary flow cross sections to enable efficient counteracting of a fire by means of supplying an extinguishing liquid. Thus, multiple delaying measures for fire prevention or firefighting can be combined with a single technology, namely the thermal insulation of cells or battery modules as well as extinguishing using an extinguishing liquid such as water. Moreover, this technology also enables the use of conventional extinguishing lances. The design of such a filling element also has the advantage that it can be removed simply by means of dissolving it and rinsing it out by supplying the specific liquid, for example even in the event of repairs. This also simplifies the dismantling of battery modules.

The filling element can be part of the battery module or can be arranged within the battery module and/or can be arranged between two such battery modules of an energy storage device. The energy storage device can be designed as a high-voltage battery and can include not only one battery module, but also multiple battery modules. The one or more battery modules can each in turn include multiple battery cells. The filling element is preferably arranged between two adjacent battery cells of the same battery module or between two adjacent battery modules. In principle, any position of the filling element within the energy storage device is possible. Positioning adjacent to at least one battery cell is particularly advantageous above all in order to create a flow free space in case of extinguishing in the energy storage device, which is directly adjacent to this at least one battery cell, which enables particularly efficient cooling of this battery cell.

The fact that the filling element at least partially dissolves at least upon contact with a specific minimum amount of a specific liquid can be understood to mean that the filling element can on the one hand be designed in such a way that it begins to dissolve immediately as soon as it comes into contact with the specific liquid, or in such a way that the dissolving process only begins when the filling element comes into contact with the specific minimum amount of the specific liquid. The specific minimum amount can also be dependent on the amount of material that is comprised by the filling element. The more material the filling element includes, for example the larger or heavier the filling element is while the material properties remain the same, the greater the specific minimum amount of the specific liquid can be.

Furthermore, it is preferred that the specific liquid is water or that the specific liquid at least comprises water. This has the advantage that the filling element can be dissolved by supplying water, wherein water represents a particularly efficient extinguishing agent for extinguishing fires and in particular the extinguishing agent most frequently used by fire departments. The filling element is therefore preferably designed to be soluble in water, at least when it comes into contact with a specific minimum amount of water. The filling element can also be designed to be soluble in liquids other than water.

A soluble design of the filling element can be understood to mean chemical dissolving in a solvent, preferably water, as well as dissolving or decomposing into smaller individual components which, however, can still have macroscopic dimensions. For example, the cell separator element can be formed using ceramic fibers embedded in a matrix, wherein the matrix dissolves on contact with the specific minimum amount of the specific liquid, as a result of which the ceramic fibers are easily separable from one another, but are not themselves dissolved. The fibers can also be woven without being embedded in a matrix in such a way that are torn apart or separated from one another by the liquid flowing through and can simply be flushed out of the cell spaces. However, a chemically soluble design of the cell separator element, which can then be completely dissolved in water, for example, is particularly advantageous. As a result, there are no macroscopic residues that could result in a blockage or narrowing of the flow cross-sections. The filling element can therefore, for example, comprise a material which dissolves in water similarly to a salt.

If the filling element is at least partially dissolved, it loses its structural rigidity. In particular, it disintegrates into smaller macroscopic or microscopic components, as a result of which the filling element can be easily flushed out, for example, from the space between two battery cells and in particular from the housing of the energy storage device.

According to a very advantageous embodiment of the invention, the battery module includes at least two battery cells arranged adjacent to one another in a first direction, wherein the filling element is designed as a thermally insulating cell separator element arranged between the two battery cells. The arrangement between two battery cells, in particular between two adjacently arranged battery cells of the battery module, makes it possible to provide particularly good thermal insulation of the battery cells from one another and thus counteract thermal propagation particularly efficiently and in the case of extinguishing using an extinguishing agent as the specific liquid, to provide efficient cooling or extinguishing of the burning cells.

The battery cells can be formed as lithium-ion cells, for example. In addition, the battery cells can be designed, for example, as prismatic battery cells, pouch cells, or round cells. If the battery cells are designed as pouch cells or prismatic battery cells, for example, multiple such battery cells arranged next to one another in the first direction can form a cell stack of the battery module. In this example, the cell separator element can be in the form of a rectangular thin plate which is arranged in the space between the two battery cells. If the battery module, in particular such a cell stack, has numerous battery cells, the battery module can also comprise a corresponding number of such cell separator elements, which are then preferably arranged between each two battery cells arranged adjacent in the first direction. The following description of other design options for the cell separator element or, in general, for the filler element should then apply analogously to all other cell separator elements and filler elements that are optionally additionally provided in the battery module. Even if the battery cells are designed as round cells, for example, the spaces between such round cells can be filled using such a cell separator element or also using multiple such cell separator elements. The cell separator element can then, for example, surround the battery cells in a ring shape or can be designed in the form of a lattice structure having cylindrical openings in which the round cells are arranged.

Furthermore, it is preferred that the filling element is designed in such a way that it does not dissolve or does not completely dissolve on contact with the specific liquid below the specific minimum amount. This has the great advantage that the filling element does not lose its function, even if it comes into contact with high ambient humidity, for example. The filling element only dissolves when the specific minimum amount of liquid is exceeded. In addition, this has another very great advantage, which will be explained below in connection with a further very advantageous embodiment of the invention.

According to this further very advantageous embodiment of the invention, the filling element is designed to absorb and in particular to bind a specific amount of the specific liquid, in particular below the specific minimum amount of the specific liquid. The filling element can therefore have superabsorbent properties, so to speak. Thus, if the filling element comes into contact with the specific liquid and if, for example, it is a small amount of liquid, this small amount of liquid can be absorbed by the filling element. This advantageously makes it possible to provide an additional protective function and, for example, also to implement a two-stage extinguishing process. The additional protective function is provided by the fact that the filling element, which is soaked with liquid, provides an additional thermal barrier between the cells and, in addition, an enormous amount of energy is required in order to evaporate the liquid absorbed and bound by the filling element. This withdraws an enormous amount of energy from a possible fire and also contributes to extinguishing and counteracting such a fire. In addition, embodiments are conceivable according to which, to extinguish or counteract a battery fire, the battery comprising the battery module or the battery module itself is supplied with an extinguishing liquid, for example water, from an extinguishing liquid reservoir inside the vehicle and not externally from the fire department. Typically, due to the limited installation space situation in a motor vehicle, only small amounts of extinguishing liquid can be provided. The extinguishing liquid can be, for example, radiator water, windshield wiper water, or cooling water from a cooling circuit, which can be supplied to the battery for extinguishing purposes in an emergency. This small amount of liquid, in particular water, does not result in the filling element or the filling elements dissolving or completely dissolving, but in this small amount of liquid being initially absorbed and bound by the filling element. As a result, the filling element can swell, for example. In this context, the cell separator element can also soften and possibly lose its previously rigid structure, but not dissolve. This creates an additional thermal barrier around the cells. Only when the fire department arrives or supplies the battery or battery module with water or another extinguishing liquid from the outside in correspondingly larger quantities and above the specified minimum quantity does the filling element dissolve and release the free spaces at or between the battery cells or battery modules to be flushed out by means of the water. Therefore, not only two, but also three extinguishing or delaying measures can be combined with one technology by the filling element, namely thermal insulating, super-absorbing, and extinguishing using water.

In order to form the filling element having superabsorbent properties, it can include a superabsorbent material, for example a superabsorbent polymer. The filling element can be composed of a number of different materials, for example, for example a superabsorbent polymer can be embedded in a water-soluble matrix. However, it is particularly advantageous and preferred if the filling element comprises a hydrophilic aerogel and, in particular, is formed entirely from a hydrophilic aerogel. Aerogels are generally open-pored, nanostructured materials that are obtained, for example, from aqueous solutions by gelation, i.e., a so-called sol-gel process, and suitable drying methods. Aerogels can be provided with innumerable different desired properties and structures. The pore size of such aerogels can be in the nanometer range and the internal surface areas can be extraordinarily large. Aerogels are thus outstandingly suited as thermal insulators, for example, since they consist largely of air. Aerogels can be formed having extremely low thermal conductivity and high temperature stability. In principle, they are therefore particularly well suited as thermal barriers between cells. Aerogels can also be designed having the desired superabsorbent and/or soluble properties described above. A hydrophilic aerogel is to be understood here, in particular in contrast to a hydrophobic aerogel, as an aerogel which is designed to be at least soluble and which is preferably also designed to absorb a certain amount of liquid. While hydrophobic aerogels are preferred for most applications and water-soluble aerogels in particular are undesirable, this embodiment of the invention uses the knowledge that a hydrophilic aerogel can be used to provide a filling element which under normal conditions and without the supply of water to a battery module can provide excellent thermal insulating properties between the cells, while the filling element can be simply rinsed out of the cell space using water for extinguishing purposes.

According to a further embodiment of the invention, it is provided that the filling element is designed to be soluble in such a way that it dissolves at least in part as soon as it comes into contact with the specific liquid. It can also be provided that complete dissolution of the filling element is only possible when it comes into contact with the specific minimum amount of each specific liquid. However, it can also be that the filling element can already be completely dissolved as soon as it comes into contact with the specific liquid, without a specific minimum amount being required. This is less preferred, however, since an additional protective function can be provided precisely by the possibility of liquid absorption described above.

According to a further advantageous embodiment of the invention, the battery module includes several of the filling elements designed as cell separators and numerous battery cells arranged adjacent to one another in the first direction, wherein one of the cell separators is arranged between each two battery cells arranged adjacent in the first direction. All of these cell separator elements can be designed as already described for the filling element. A very good thermal separation of the individual battery cells can thus advantageously be provided even in the case of large battery modules having a large number of battery cells, which does not prevent efficient extinguishing in case of a battery fire.

It can furthermore be provided that the energy storage device has a space which is not located between two battery cells of the same battery module and which is arranged in particular outside of the cell stack formed by the battery cells of the battery module, wherein the filling element is arranged in the space. The filling element can, for example, be arranged on the outside of a cell stack or surround it in areas or completely. For example, the filling element can be arranged between two battery modules of a high-voltage battery. This can create an additional thermal barrier between the battery modules. Such a filling element can also be arranged between the battery module and, for example, a housing cover of an overall battery housing or a housing bottom of an overall battery housing or a side wall of the overall battery housing. As a result, thermal insulation of the battery modules to the outside can also be provided. In this way, the area surrounding an energy storage device in a motor vehicle can also be very well protected from any heat that may develop in connection with the thermal runaway of one or more of the battery cells. The filling element can also be arranged between the battery module and a partition wall between two battery modules. The filling element can be arranged, for example, at any other location within a battery module or the energy storage device.

If the energy storage device comprises multiple filling elements, these can also be designed differently with regard to their material composition and/or their material properties.

Furthermore, the invention also relates to a motor vehicle having an energy storage device according to the invention or one of its embodiments.

Furthermore, the invention also relates to a method for counteracting a fire in an energy storage device for a motor vehicle, which includes a battery module and at least one thermally insulating filling element. In order to counteract the fire, a specific liquid is supplied to the energy storage device, wherein the filling element dissolves at least in part upon contact with a specific minimum quantity of the specific liquid.

Again, the advantages mentioned in the context of the energy storage device according to the invention and its embodiments also apply in the same manner to the method according to the invention.

The invention also includes refinements of the method according to the invention, which comprise features as have already been described in conjunction with the refinements of the energy storage device according to the invention. For this reason, the corresponding refinements of the method according to the invention are not described again here.

The motor vehicle according to the invention is preferably designed as an automobile, in particular as a passenger vehicle or truck, or as a passenger bus or motorcycle.

The invention also comprises the combinations of the features of the described embodiments. The invention therefore also comprises implementations that each include a combination of the features of several of the described embodiments, provided that the embodiments were not described as mutually exclusive.

BRIEF DESCRIPTION OF THE FIGURES

Exemplary embodiments of the invention are described hereinafter. In the figures.

DETAILED DESCRIPTION

Figures 1, 2:
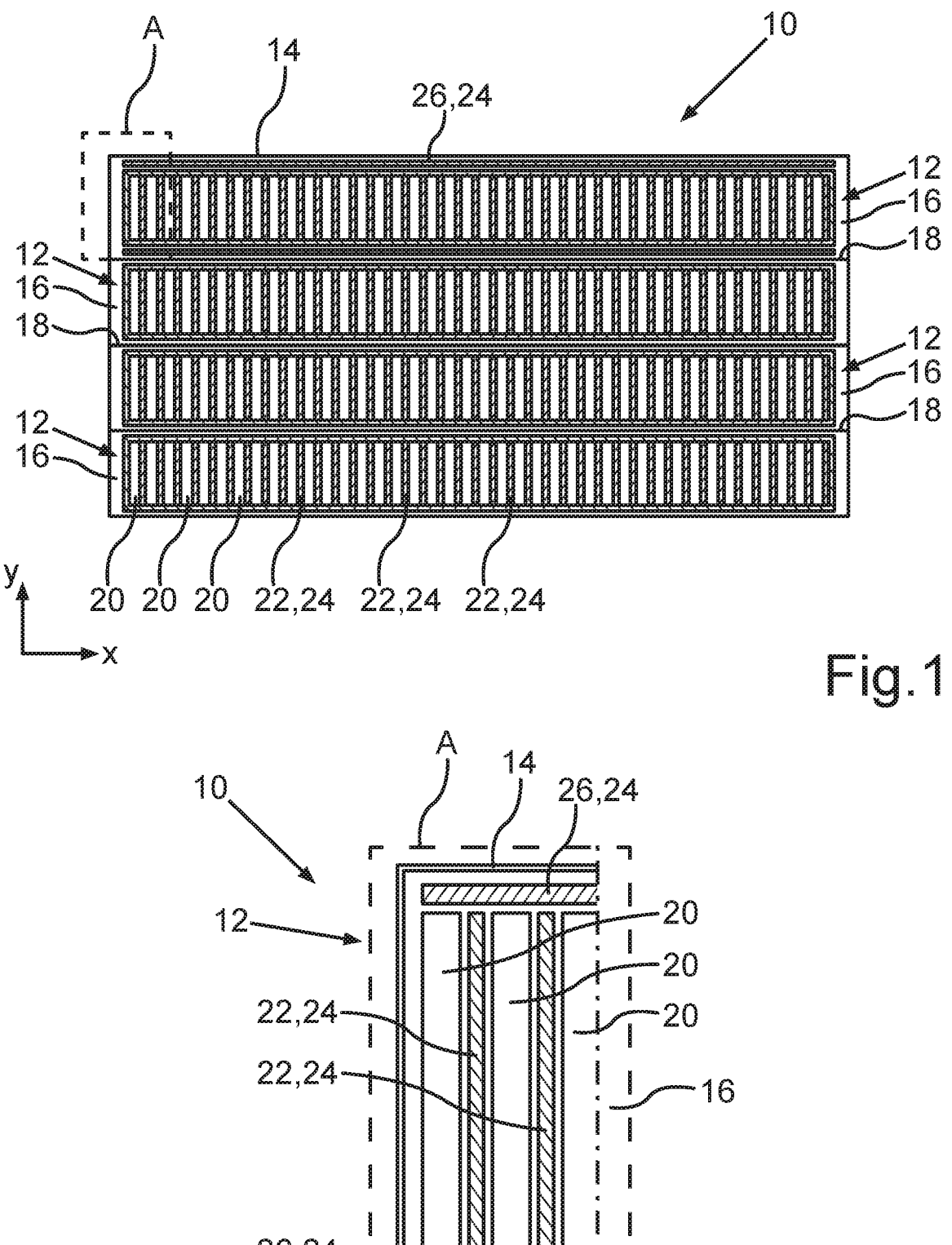
FIG. 1 shows a schematic representation of a high-voltage battery having multiple battery modules according to an exemplary embodiment of the invention.
FIG. 2 shows a schematic representation of a part of the high-voltage battery of FIG. 1 according to an exemplary embodiment of the invention.

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the figures, same reference numerals respectively designate elements that have the same function.

FIG. 1 shows a schematic representation of a high-voltage battery 10 as an example of an energy storage device 10, having multiple battery modules 12 according to an exemplary embodiment of the invention. The high-voltage battery 10 generally includes a battery housing 14 which provides a respective receiving area 16 for each battery module 12. The receiving areas 16 can be spatially separated from one another, for example by partition walls 18, but this does not necessarily have to be the case. A respective battery module 12 in turn includes multiple battery cells 20 which are arranged adjacent to one another in the x-direction in this example. For reasons of clarity, only a few of the battery cells 20 are provided with a reference sign. In this example, the battery cells 20 are designed as prismatic battery cells, but can generally also be designed differently. In this example, there is a filling element 22 in the form of a cell separator element 22 between each two battery cells arranged adjacent in the stacking direction X of a respective battery module 12. Here as well, only a few of these cell separator elements 22 are provided with a reference number for reasons of clarity. These cell separator elements 22 are manufactured from an NTP (No thermal propagation) material, which is provided by a hydrophilic aerogel 24 in this preferred example. This advantageously makes it possible to equip the cell separator elements 22 with particularly advantageous properties. The cell separator elements 22 are designed in such a way that when they are not in contact with a specific liquid, in particular water, they are in a dimensionally stable state, as illustrated in FIG. 1 and FIG. 2. FIG. 2 shows in particular an enlarged detailed view of a part A of the energy storage device 10 from FIG. 1. In this dimensionally stable state of the cell separator elements 22, they have very good thermally insulating properties, since they have a very porous structure due to the formation of a hydrophilic aerogel 24 possess and consist accordingly to a large extent of air or gas in general. As a result, a very good thermal barrier to the adjacent battery cells 20 can be provided by the cell separator elements 22 in the event of a thermal runaway of one of the battery cells 20. A thermal spread to an adjacent battery cell 20 can thus be prevented particularly efficiently. It can be advantageous to provide such thermal insulation not only in the form of cell separator elements 22 between the cells 20, but also, for example, as corresponding filling elements 26 at another point, such as here, for example, surrounding the respective cell stack of the multiple battery cells 20 of a respective battery module 12 In this way, the battery modules 12 can also be thermally insulated to the outside and from one another. These filling elements 26 can be designed having the same properties as the cell separator elements 22 and in particular can also be manufactured from the same material 24. Correspondingly, these filling elements 26 are also preferably provided by a hydrophilic aerogel 24. The following descriptions of the cell separator elements 22 therefore also apply in the same way to these further filling elements 26.

Despite the good thermal insulation between the cells 20, thermal runaway of several of the battery cells 20 can occur simultaneously, for example in the event of a crash or accident of the motor vehicle which comprises this high-voltage battery 10. As a result, under certain circumstances, a battery fire 30 can occur, as is shown schematically in FIG. 3 and in FIG. 4. FIG. 3 again shows the high-voltage battery 10 from FIG. 1, but now in case of a fire, in which multiple battery cells 20 have caught fire, and FIG. 4 again shows a schematic detailed view of a detail A of the high-voltage battery from FIG. 3.

It has proven most effective for firefighting to supply an extinguishing agent, such as water 32 in this example, to the battery 10 or the relevant battery module 12 and to have this water 32 flow around the battery cells 20 accordingly. In order to enable flow through, the battery 10 can moreover also include a suitable drain, for example in the housing 14.

With conventional batteries, however, there is the problem that the filling of any spaces with thermally insulating material has the result that, in case of flooding, there is no longer any free space available to enable efficient flow around the battery cells. Efficient extinguishing of a battery fire is therefore not possible in conventional batteries, or at least not in a space-saving manner, because otherwise free spaces through which a flow can flow have to be reserved, which requires additional installation space.

The cell separator elements 22, as well as the other filling elements 26, are now advantageously designed in such a way that they at least partially dissolve upon contact with water or at least upon contact with a specific minimum amount of water. It is particularly preferred that the cell separator elements 22 initially do not dissolve upon contact with a small amount of water, in particular less than the predetermined minimum amount, but instead soak up or absorb the water 32 and thereby bind it and swell up themselves. Only when the maximum possible amount of water has been absorbed by the cell separator elements 22 and these are saturated, so to speak, do they dissolve when the water is supplied further and are flushed out of the spaces 34 by the supplied water 32. The same also applies to the filling elements 26, which are then correspondingly flushed out of the free space 36 in which they are arranged.

Figures 3, 4:
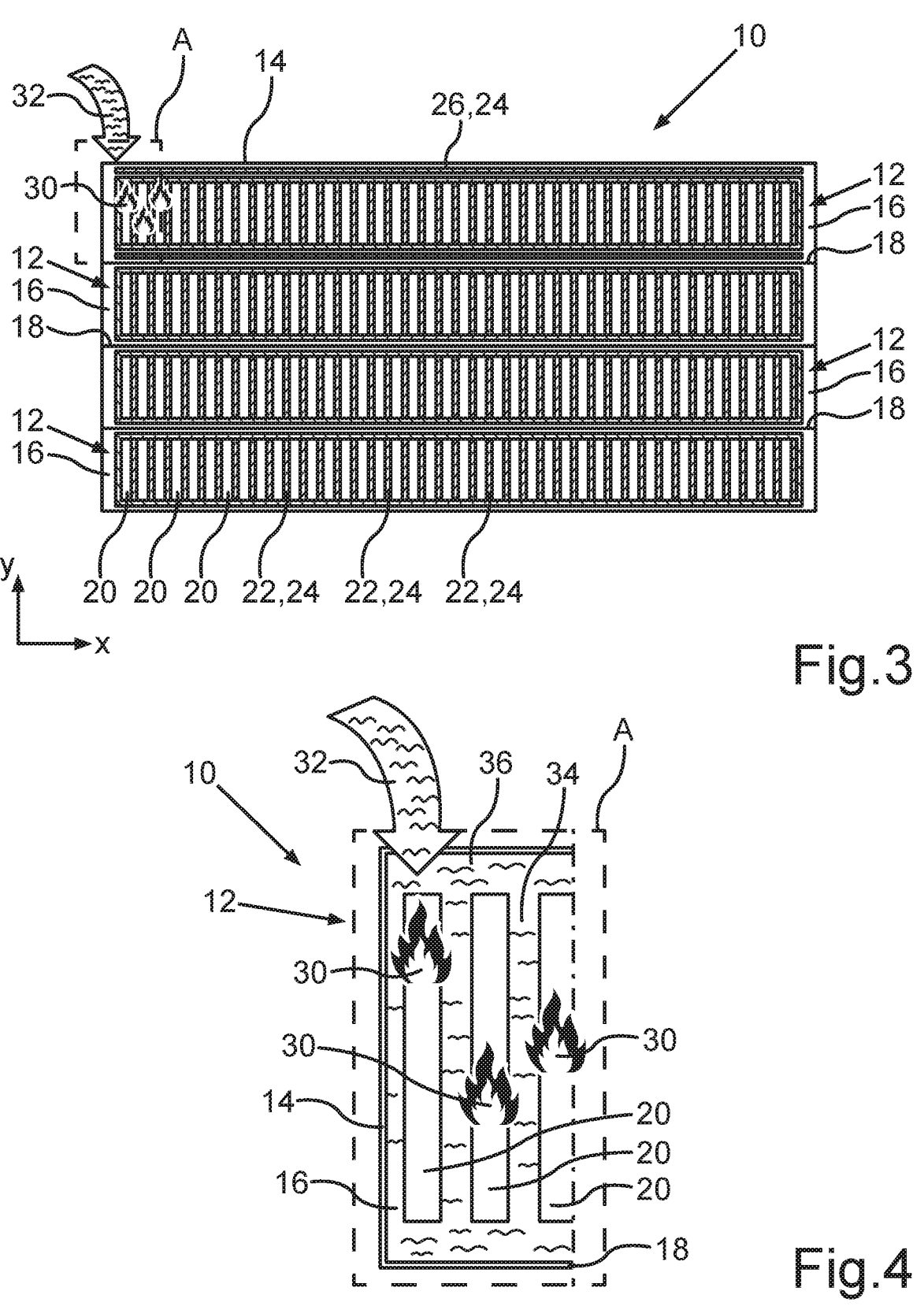
FIG. 3 shows a schematic representation of the high-voltage battery of FIG. 1 in case of a module fire according to an exemplary embodiment of the invention.
FIG. 4 shows a schematic representation of part of the high-voltage battery of FIG. 3 during or after the supply of extinguishing water to extinguish the fire according to an exemplary embodiment of the invention.

FIG. 4 correspondingly shows a state of part of the energy storage device 10 in which the cell separator elements 22 and the filling elements 26 have already been dissolved and the supplied water 32 accordingly washes around the battery cells 20. This enables particularly efficient fire extinguishing and firefighting.

The fire protection material 24 described is thus located between the cells 20 or between the cell modules 12 in the form of the cell separator elements 22 or filling elements 26, which has the focus of having the lowest possible thermal conductivity. This material 24 ensures "No Thermal Propagation", thus preventing thermal propagation across all battery cells 20 when one of the battery cells runs away 20 thermally. Due to the hydrophilic design of this NTP material 24, for example in the form of hydrophilic aerogels 24, good thermal insulation in the undissolved state of this material 24 can be provided at the same time, as well as water solubility at the same time. This makes it possible for the material 24, in particular in the form of the cell separator elements 22 and the filling elements 26, to be flushed out of the housing 14 by water 32. As a result, additional flow cross sections are uncovered. In addition, this material can provide 24 superabsorbent properties. With small amounts of water, the material 24 from which the cell separator elements 22 and the filling elements 26 are formed can be swollen analogously to a super absorber. This has the result that the water 32 absorbed by the cell separators 26 remains in place around the burning cell 20, requiring a great deal of energy to evaporate the amount of water absorbed by the cell separator 22. In principle, one of the following combinations of properties can be provided by the cell separator elements 22 or filling elements 26: thermal insulation and water solubility, thermal insulation and superabsorber property, thermal insulation and water solubility and superabsorber property. However, the implementation of the water-soluble properties is particularly advantageous here.

Because the cell separator elements 22 have superabsorbent properties, a two-stage extinguishing method can be implemented in a particularly advantageous manner. This enables water inside the vehicle, for example wiper water or cooling water, to be routed locally to the area of the burning cells 20 in a first extinguishing step. Due to the superabsorber properties, the water 32 is absorbed by the NTP material 24, in this case the hydrophilic aerogel 24, and held around the cells 20 permanently. The evaporation of the water requires a correspondingly large amount of energy and has prevented the fire 30 from spreading to other cells 20 in preliminary tests.

In a next step, for example, a fire department would now be on location and could flush the hydrophilic fire protection material 24 out of the housing 14 using the large amount of extinguishing agent carried along, in particular water 32, which in turn would open up the flow cross sections in the high-voltage battery 10. With this measure at the latest, a burning electric vehicle can be extinguished even after excessive loads.

Overall, the examples show how the invention can be used to provide hydrophilic aerogels as intermediate cell material for fulfilling NTP and for active flushing in case of extinguishing. This allows extinguishing from the outside using water while maintaining the NTP fire protection measures, namely thermal insulation. In this way, no additional space is required to create the necessary flow cross-sections and a synergetic, space-neutral introduction of super absorbers is also implementable.

The invention claimed is:

1. An energy storage device for a motor vehicle, comprising:
    a battery module including at least two battery cells arranged adjacent to one another in a first direction; and
    a thermally insulating filling element, the thermally insulating filling element being a cell separator element arranged between the two battery cells,
    wherein the thermally insulating filling element is configured to absorb and bind water in an amount less than a specific minimum amount of water without dissolving, and to dissolve at least in part and be flushed out from between the two battery cells when contacted with water in an amount greater than the specific minimum amount of water, thereby opening a flow space for the water between the two battery cells.

2. The energy storage device according to claim 1, wherein the cell separator element comprises a hydrophilic aerogel.

3. The energy storage device according to claim 1, wherein the battery module includes a plurality of thermally insulating cell separator elements, and a respective one of the thermally insulating cell separator elements is arranged between each pair of battery cells that are adjacent to one another in the first direction.

4. The energy storage device according to claim 1, further comprising a thermally insulating filling element arranged in an intermediate space which is not located between two battery cells of the same battery module and which is arranged outside of the cell stack formed by the battery cells of the battery module.

5. A method for counteracting a fire of an energy storage device for a motor vehicle, the energy storage device including a battery module having at least two battery cells arranged adjacent to one another in a first direction and a thermally insulating filling element, the thermally insulating filling element being a cell separator element arranged between the two battery cells, the method comprising:
    supplying water to the energy storage device,
    wherein the cell separator element absorbs and binds the water without dissolving when the supplied water is less than a specific minimum amount of water, and
    wherein the cell separator element dissolves at least in part and is flushed out from between the two battery cells when the supplied water is greater than the specific minimum amount of water, thereby opening a flow space for the water between the two battery cells.

6. The energy storage device of claim 1, wherein the cell separator element comprises a superabsorbent material embedded in a water-soluble matrix.

7. The energy storage device of claim 1, wherein the cell separator element comprises ceramic fibers embedded in a matrix, and wherein the matrix dissolves upon contact with at least the specific minimum amount of water.

8. The method of claim 5, wherein the cell separator element comprises a hydrophilic aerogel.

9. The method of claim 5, wherein the battery module includes a plurality of thermally insulating cell separator elements, and a respective one of the thermally insulating cell separator elements is arranged between each pair of battery cells that are adjacent to one another in the first direction.

10. The method of claim 5, wherein the energy storage device further comprises a thermally insulating filling element arranged in an intermediate space which is not located between two battery cells of the same battery module and which is arranged outside of the cell stack formed by the battery cells of the battery module.

11. The method of claim 5, wherein the cell separator element comprises a superabsorbent material embedded in a water-soluble matrix.

12. The method of claim 5, wherein the cell separator element comprises ceramic fibers embedded in a matrix, and wherein the matrix dissolves upon contact with at least the specific minimum amount of water.

\* \* \* \* \*